(12) United States Patent
Chen

(10) Patent No.: US 9,962,759 B2
(45) Date of Patent: May 8, 2018

(54) RECESSED SCREW, FORMING PUNCH AND DRIVING TOOL

(71) Applicant: ESSENCE METHOD REFINE CO., LTD., Tainan (TW)

(72) Inventor: Ling-Fang Chen, Tainan (TW)

(73) Assignee: Essence Method Refine Co., Ltd., Tainan (TW)

( * ) Notice: Subject to any disclaimer, the term of this patent is extended or adjusted under 35 U.S.C. 154(b) by 395 days.

(21) Appl. No.: 14/683,427

(22) Filed: Apr. 10, 2015

(65) Prior Publication Data

US 2016/0245325 A1     Aug. 25, 2016

(51) Int. Cl.
| | | |
|---|---|---|
| *B21K 1/46* | (2006.01) | |
| *F16B 35/06* | (2006.01) | |
| *B25B 15/00* | (2006.01) | |
| *F16B 23/00* | (2006.01) | |

(52) U.S. Cl.
CPC ............ *B21K 1/463* (2013.01); *B25B 15/005* (2013.01); *F16B 23/003* (2013.01); *F16B 35/06* (2013.01)

(58) Field of Classification Search
CPC .... F16B 23/00; F16B 23/0007; F16B 23/003; F16B 35/06
USPC .......................................... 411/402, 403, 405
See application file for complete search history.

(56) References Cited

U.S. PATENT DOCUMENTS

| | | | | | |
|---|---|---|---|---|---|
| 2,084,079 | A | * | 6/1937 | Clark .................. | F16B 23/0023 411/403 |
| 2,216,382 | A | * | 10/1940 | West ................... | F16B 23/0023 411/403 |
| 2,285,461 | A | * | 6/1942 | Purtell ................ | F16B 23/0007 411/403 |
| 2,369,853 | A | * | 2/1945 | Purtell ................ | F16B 23/0007 411/403 |
| 2,592,462 | A | * | 4/1952 | Phipard, Jr. ......... | F16B 23/0023 411/403 |
| 3,295,572 | A | * | 1/1967 | Wing ................... | B25B 15/005 403/361 |
| 4,151,621 | A | * | 5/1979 | Simmons ............. | B21K 1/463 411/407 |
| 5,203,657 | A | * | 4/1993 | Nagoshi .............. | F16B 35/065 411/188 |
| 2003/0002952 | A1 | * | 1/2003 | Totsu ................. | B21K 1/46 411/403 |
| 2005/0047891 | A1 | * | 3/2005 | Toyooka ............. | F16B 23/0023 411/403 |

(Continued)

*Primary Examiner* — Roberta S Delisle
(74) *Attorney, Agent, or Firm* — Rosenberg, Klein & Lee

(57) ABSTRACT

A screw includes a head having a top surface where a drive socket and drive regions are recessedly formed. Each drive region has two non-parallel side walls and two different drive walls. One drive wall is connected to the side walls to form a groove communicating with the drive socket. The other drive wall is connected between two adjacent side walls of two adjacent grooves. At least one of the drive walls slopes downwards from the top surface at a slope of at least 1 degree. Each side wall connecting between the drive walls deviates inwards by an angle difference of at least 1 degree. The slope and the inward deviation of the walls receive a driving tool firmly to prevent a swinging problem and enhance the torque transmission. A punch adapted to form the recessed screw also facilitates a long-term production without losing the accuracy thereof.

7 Claims, 11 Drawing Sheets

(56) References Cited

U.S. PATENT DOCUMENTS

2006/0110237 A1\* 5/2006 Belinda ................ B25B 15/005
411/403

\* cited by examiner

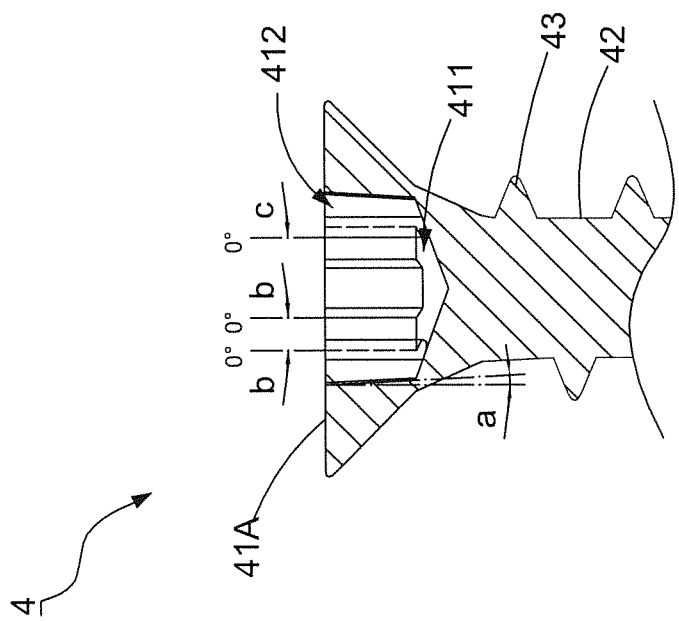
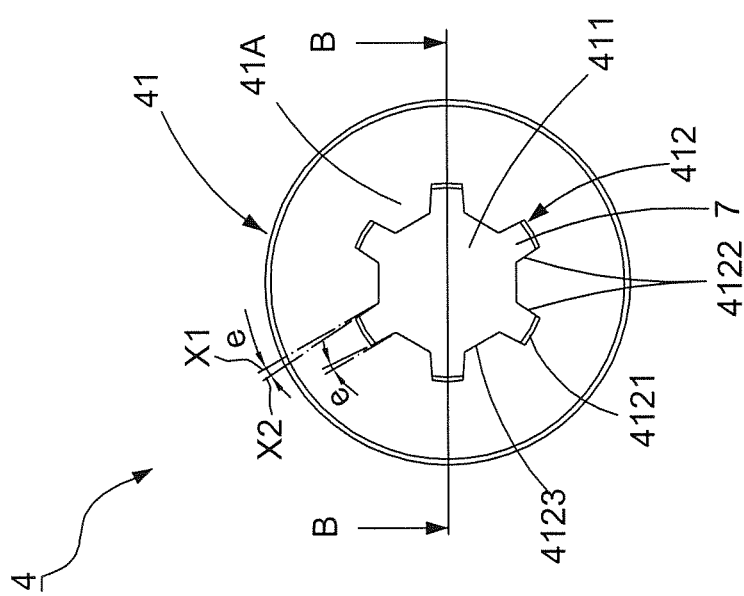
FIG. 5
FIG. 4

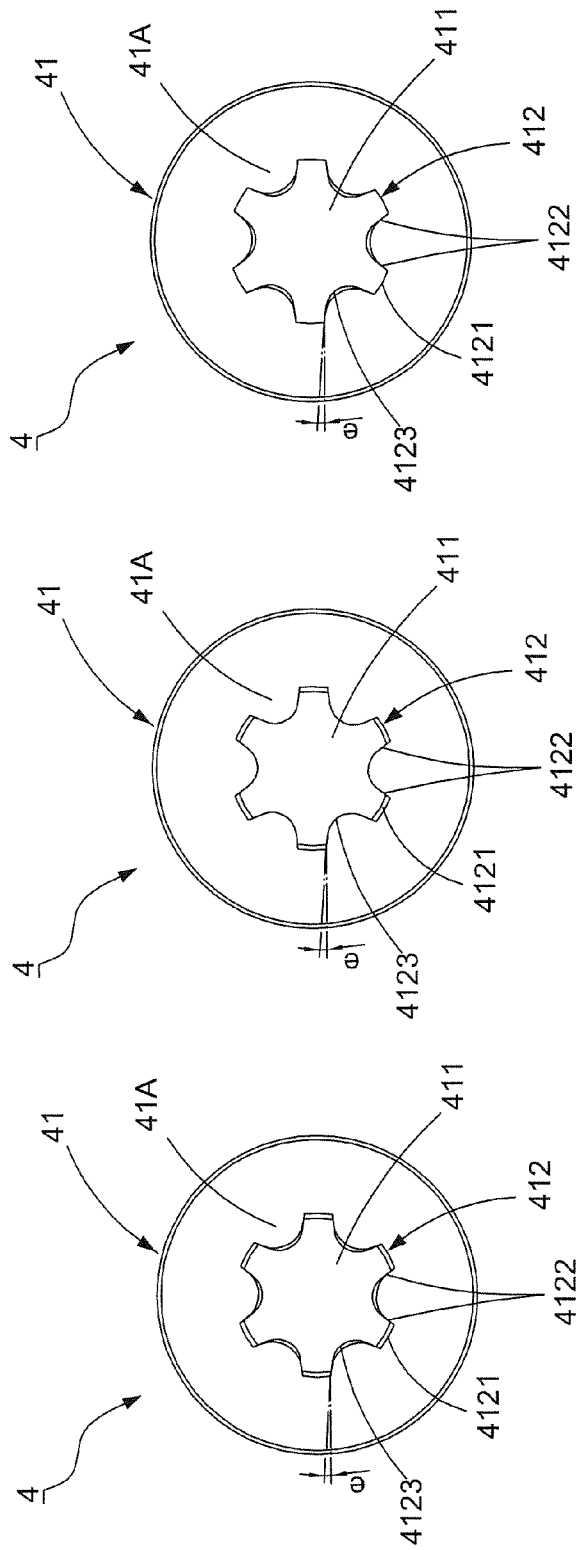

RECESSED SCREW, FORMING PUNCH AND DRIVING TOOL

BACKGROUND OF THIS INVENTION

1. Field of this invention

This invention relates to a fastener system and relates particularly to a recessed screw, a punch for forming a socket on a screw head and a driving tool for use in the screw head.

2. Description of the Related Art

International universal recesses of screw heads for engaging with driving tools, as shown in FIG. 1, may include "slotted" sockets, "Phillips" sockets, "Pozi" sockets, square sockets, hexagonal sockets, "Torx" sockets and so on. Generally, the driving tools and the screws with corresponding sockets are usually made by different manufacturers, so the driving tools are usually unable to be completely received in the sockets of the screw heads. If the driving tool is given a higher driving torque, the socket may become deformed when it cannot bear the torque, or the driving tool may slip out of the socket because of the torque that the screw head cannot undertake. These problems decrease the driving efficiency, render the socket unable to be used because of the deformation, affect the duration of the screw and cause the incompleteness of the screwing process. Accordingly, some manufacturers have invented screws with special drive sockets to enhance the engagement between the socket and the tool. Those screws can only cooperate with their corresponding tools, but they cannot receive tools adapted to the international universal sockets as described above. Thus, those special sockets cannot be widely used in the global market.

SUMMARY OF THIS INVENTION

An object of this invention is to provide a recessed screw which receives and engages with a driving tool firmly to prevent a swinging movement of the tool at the time of insertion and also enhances the torque transmitting effect. A corresponding punch for forming a socket on a head of the recessed screw and a driving tool for engaging therewith are also provided.

A recessed screw in accordance with this invention comprises a head with a top surface and a bottom surface opposite thereto, a shank extending downwards from the bottom surface and a plurality of threads spirally disposed on the shank. The top surface has a drive socket recessedly formed thereon and a plurality of drive regions disposed around the drive socket. Each drive region has two opposite side walls and two different drive walls which are not directly connected to each other. The two drive walls are respectively connected to the two opposite side walls. One of the drive walls has two sides thereof connected to the two side walls to form a groove communicating with the drive socket. The other drive wall is connected between two adjacent side walls of any two adjacent grooves. At least one of the drive walls has a surface which slopes downwards from the top surface at a slope of at least 1 degree. Each side wall and the other drive wall meet at a point from which a reference line is defined. Each side wall connecting between the two drive walls also defines a drive line deviating inwards from the reference line toward a central portion of the drive region by an angle difference of at least 1 degree, so the two opposite side walls of each drive region are not parallel to each other. Accordingly, the use of the slanting surface at the slope of at least 1 degree defined by at least one drive wall or by both drive walls renders a driving tool able to engage with the drive socket and the drive regions firmly. The slope of the surfaces and the inward deviation of the side walls also prevent the driving tool from swinging when the tool is inserted into the drive socket in order to ensure that the driving tool is held in a center of the drive socket for attaining an even and effective transmission of torque and saving labor. This head structure having the above walls which are constructed by multiple slanting surfaces can also be operated by one hand. A driving tool for use in the drive socket of the head and a punch for punching the recessed head are also provided to facilitate a long-term production without losing the accuracy of production.

Preferably, the two drive walls are defined by an end wall and a connecting wall. Two sides of the end wall are respectively connected to the two side walls for defining the groove, and the connecting wall is disposed between the adjacent side walls of two adjacent grooves. The connecting wall can be formed in an arched contour or shape.

Preferably, the end wall has a slanting surface sloping downwards from the top surface at the slope of at least 1 degree, whereas the connecting wall has a surface perpendicular to the top surface. Alternatively, the connecting wall has a slanting surface sloping downwards from the top surface at the slope of at least 1 degree, whereas the end wall has a surface perpendicular to the top surface. Alternatively, both of the drive walls, namely the end wall and the connecting wall, have respective slanting surfaces sloping downwards from the top surface at the slope of at least 1 degree.

Preferably, each of the two side walls can also have a slanting surface sloping downwards from the top surface at the slope of at least 1 degree.

A further object of this invention is to provide a punch for forming the recessed screw of this invention. The punch includes a punch body for punching a drive socket and a plurality of drive regions in a screw head and a punch shank protruding from an end of the punch body. The punch shank punches and forms the drive socket and has a peripheral wall complementary in shape with the walls of the drive regions as described above. The peripheral wall is provided with projections, valleys alternating with the projections and transitional walls connected between the projections and valleys. Each drive region is punched by the peripheral wall of the punch shank to form two opposite and non-parallel side walls and two different drive walls. Two sides of one drive wall are connected to the two side walls to define a groove communicating with the drive socket. The other drive wall is connected between two adjacent side walls of any two adjacent grooves. Each side wall connecting between the two drive walls goes inwards toward a central portion of the drive region by an angle difference of at least 1 degree. Further, either of the drive walls or both of the drive walls can have a slanting surface sloping downwards from the top surface of the head at a slope of at least 1 degree. The corresponding punch for forming the head facilitates a long-term production and keeps the accuracy of the production.

A further object of this invention is to provide a driving tool for use in the recessed screw of this invention. The driving tool includes a driving body and a driving shank connected to the driving shank. The driving shank is received in the aforementioned screw head having a drive socket and a plurality of drive regions, each of which has two opposite side walls and two different drive walls respectively connected to the two side walls. Either of the drive walls or both of the drive walls can slope downwards from the top surface of the head at a slope of at least 1 degree to provide a slating surface. The two opposite side walls of each drive region are not parallel to each other as each side wall connecting between the two drive walls deviates toward a central portion of the drive region by an angle difference of at least 1 degree. Accordingly, the driving shank can be in close contact with the drive socket and the drive regions when the driving shank is inserted into the drive socket, thereby enhancing the effect of transmitting torque created by the driving tool.

The advantages of this invention over the known prior arts are more apparent to those of ordinary skilled in the art upon reading following descriptions in conjunction with the accompanying drawings.

BRIEF DESCRIPTION OF THE DRAWINGS

FIG. 4 is a top plan view showing a second preferred embodiment of this invention;

FIG. 5 is a cross-sectional view of the second preferred embodiment as seen along the line B-B of FIG. 4;

FIGS. 8A-8C are top plan views showing respective variations of FIG. 2, FIG. 4 and FIG. 6 in this invention;

DETAILED DESCRIPTION OF THE PREFERRED EMBODIMENTS

Figure 1:
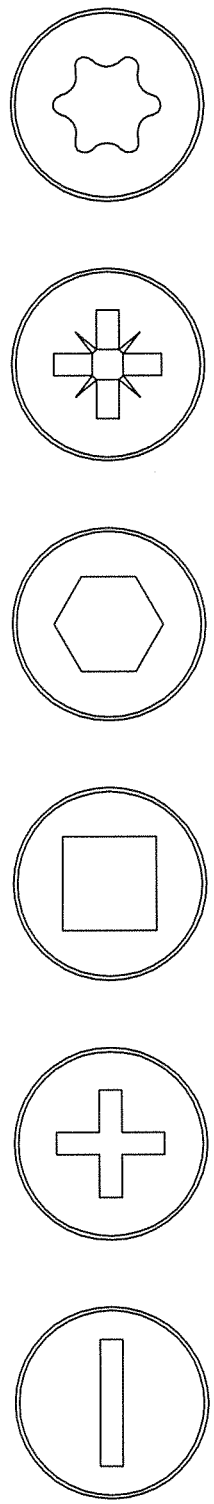
FIG. 1 is a top plan view showing international universal drive sockets of a conventional design.
Figure 3:
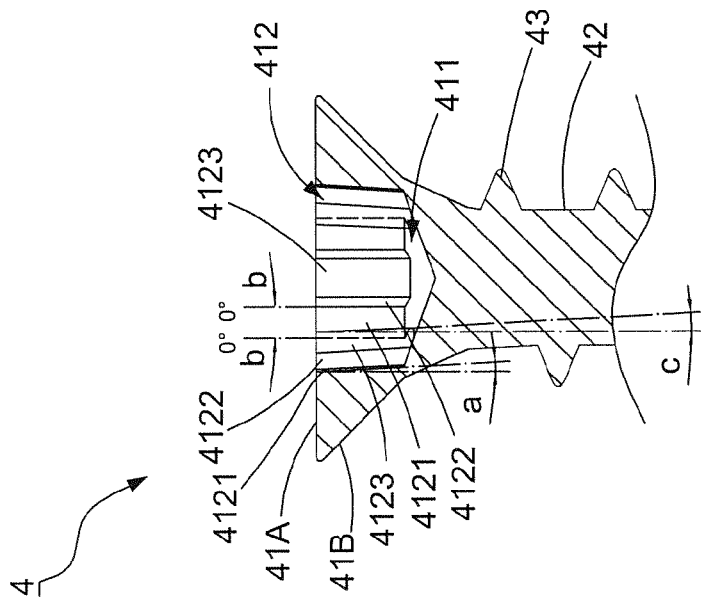
FIG. 3 is a cross-sectional view of the first preferred embodiment as seen along the line A-A of FIG. 2.
Figure 2:
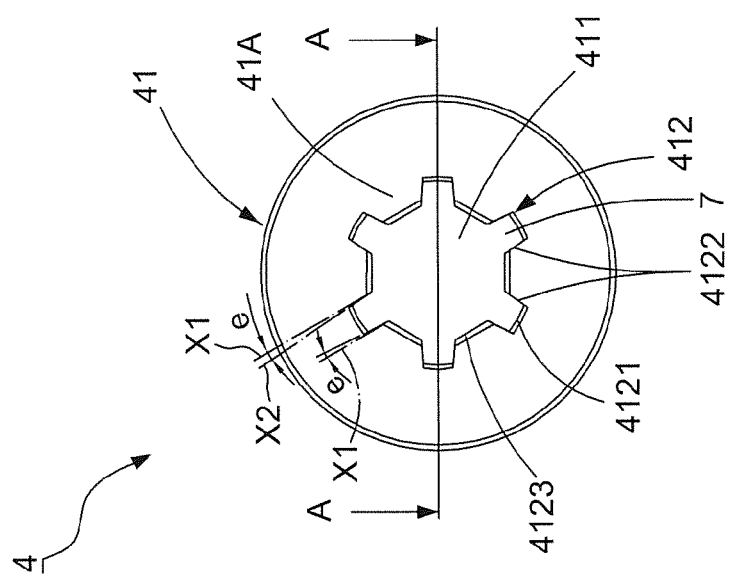
FIG. 2 is a top plan view showing a first preferred embodiment of this invention.

Referring to FIG. 2 and FIG. 3, a recessed screw 4 of a first preferred embodiment of this invention includes a head 41 having a top surface 41A and a bottom surface 41B opposite to the top surface 41A, a shank 42 extending downwards from the bottom surface 41B, and a plurality of threads 43 spirally disposed on the shank 42. The top surface 41A has a drive socket 411 recessedly formed thereon and a plurality of drive regions 412 surrounding the drive socket 411. Three, six or more drive regions 412 can be made according to the need. Herein, six drive regions 412 are adopted as an example. Further, each of the drive regions 412 has two opposite side walls 4122 and two different drive walls 4121, 4123 which are not directly connected to each other. The two drive walls 4121, 4123 are respectively connected to the two opposite side walls 4122 and form spaced-apart grooves 7 for the drive regions 412. Specifically, the drive walls are defined by an end wall 4121 and a connecting wall 4123. The end wall 4121 has two sides thereof connected to the two side walls 4122 for defining a groove 7, and the connecting wall 4123 is disposed between the adjacent side walls 4122 of two adjacent grooves 7. Therefore, the grooves 7 of the drive regions 412 are disposed at intervals. Furthermore, at least one of the drive walls 4121, 4123 can have a slanting surface which slopes downwards from the top surface 41A of the head 41 at a slope of at least 1 degree. In other words, only the end wall 4121, only the connecting wall 4123 or both walls 4121, 4123 may provide a slanting surface at the slope of at least 1 degree, and the slope can be set at 1 degree or greater than 1 degree, e.g. 3 degrees. The side walls 4122 can have a surface inclined to the top surface 41A (shown in FIG. 10) or have a perpendicular surface with a slope of 0 degree (shown in FIG. 2). In addition, each side wall 4122 and the connecting wall 4123 meet at a point from which a reference line X1 is defined. Preferably, each drive region 412 defines two reference lines X1 which are parallel to each other. Further, each side wall 4122 itself connects between the end wall 4121 and the connecting wall 4123 to define a drive line X2 which deviates inwards from the reference line X1 toward a central portion of the drive region 412 by an angle difference of at least 1 degree. Surely, the difference between the two lines X1, X2 can be set at 1 degree or greater than 1 degree, e.g. 3 degrees. Thus, the two opposite side walls 4122 of each drive region 412 are not parallel to each other.

Figure 7:
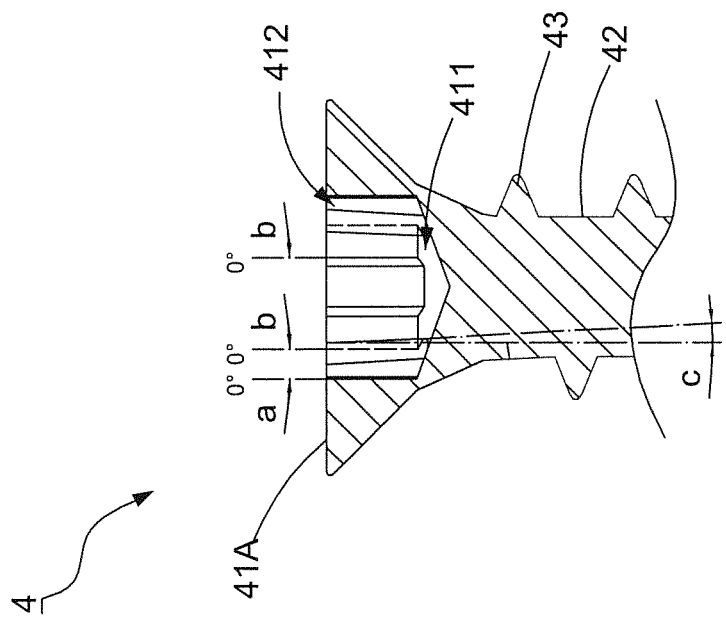
FIG. 7 is a cross-sectional view of the third preferred embodiment as seen along the line C-C of FIG. 6.
Figure 6:
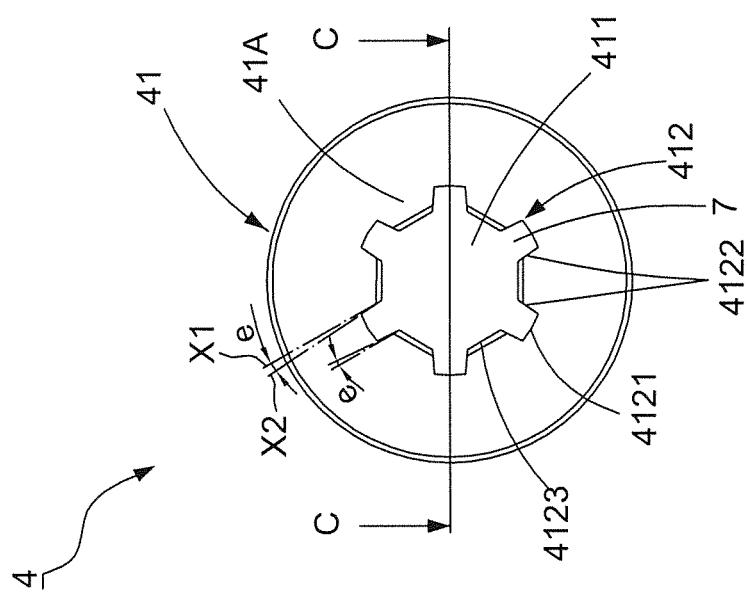
FIG. 6 is a top plan view showing a third preferred embodiment of this invention.

From above, this invention shows different preferred embodiments as follows. For example, the end wall 4121 and the connecting wall 4123 have respective slanting surfaces canting downwards from the top surface 41A by at least 1 degree, the slopes of which are respectively designated by "a" and "c" in FIG. 3, whereas the two side walls 4122 is at a right angle, namely a slope "b" of 0 degree. The two side walls 4122, as shown in FIG. 2, goes from the connecting wall 4123 to the end wall 4121 by an angle difference "e" which is at least 1 degree. Thus, each drive region 412 of FIG. 2 and FIG. 3 forms a groove 7 providing an upper portion wider than a lower portion thereof and two vertical side walls. Alternatively, only the surface of the end wall 4121 cants downwards from the top surface 41A, designated by "a" in FIG. 5. Thus, each drive region 412 of FIG. 4 and FIG. 5 forms a groove 7 whose end wall 4121 is wider at the upper portion than the lower portion and whose two side walls 4122 and connecting wall 4123 have respective slopes "b" and "c" of 0 degree. Alternatively, only the connecting wall 4123 has the slanting surface canting downwards from the top surface 41A at the slope designated by "c" in FIG. 7. Thus, each drive region 412 of FIG. 6 and FIG. 7 forms a groove 7 whose connecting wall 4123 is wider at the upper portion than the lower portion and whose two side walls 4122 and end wall 4121 have respective slopes "b" and "a" of 0 degree.

The connecting wall 4123 can be indifferent contours. For example, the connecting wall 4123 can have a straight line as shown in FIGS. 2-7 to define the drive socket 411 as an internal hexagonal recess, or the connecting wall 4123 can have a curved or arched line as shown in FIGS. 8A-8C to define the drive socket 411 as an internal Torx hexagonal recess. These contours can be adjusted according to different materials of workplaces and uses, such as use for vehicles or construction.

Figure 9:
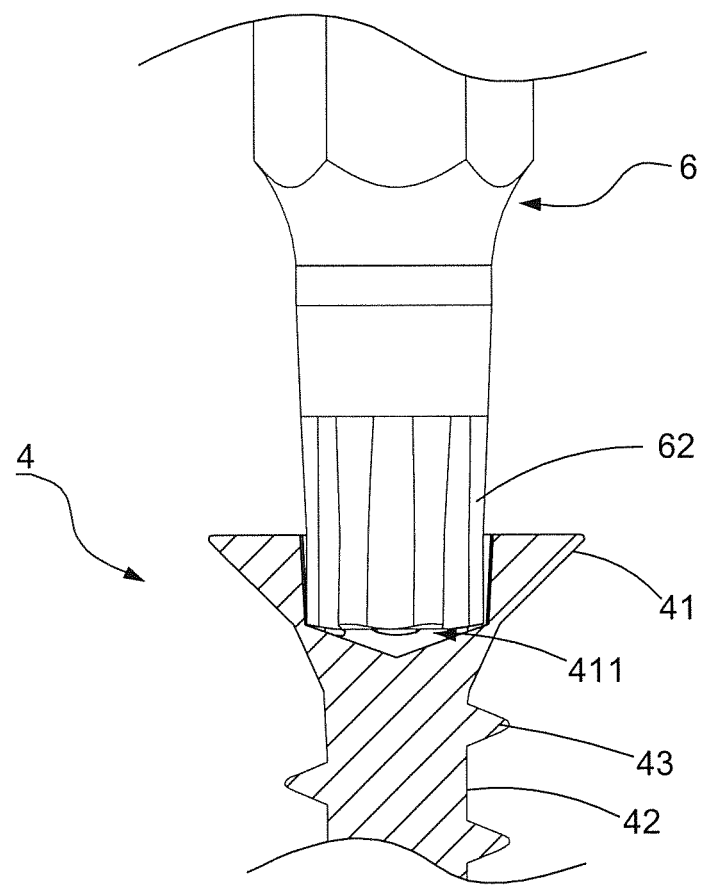
FIG. 9 is a schematic view of the drive socket of the first preferred embodiment adapted to receive a driving tool.

The use of this invention is mainly explained with the aid of FIG. 2, FIG. 3 and FIG. 9. Because the head 41 has the end wall 4121 and the connecting wall 4123 which are wider at their upper portions than their lower portions and the two side walls 4122 which are set at a right angle whereby the slope "b" is at 0 degree, a peripheral wall of a driving shank 62 of a driving tool 6 can have a firm engagement with either or both of the drive walls 4123, 4121 when the driving shank 62 is inserted into the drive socket 411. In other words, the driving shank 62 is in surface contact with the drive socket 411 and the drive regions 412. Concurrently, the angle "e" of the side walls 4122 also allows the driving shank 62 to be firmly received in a center of the drive socket 411, so the engagement between the tool 6 and the head 41 is enhanced, and the head 41 is stronger enough to endure torque created by the driving tool 6. This increased engagement between the drive socket 411 and the driving shank 62 not only prevents the driving tool 6 from swinging but also delivers the full torque transmission from the driving regions 412 and the drive socket 411 to the whole recessed screw 4 for driving the shank 42 and the threads 43. Thus, the driving operation is more convenient and saves labor. The drive socket 411 defined as a hexagonal recess can help save more labor and can also be adapted to receive a hexagonal driver bit (not shown) and applied to one hand operation.

Figure 11:
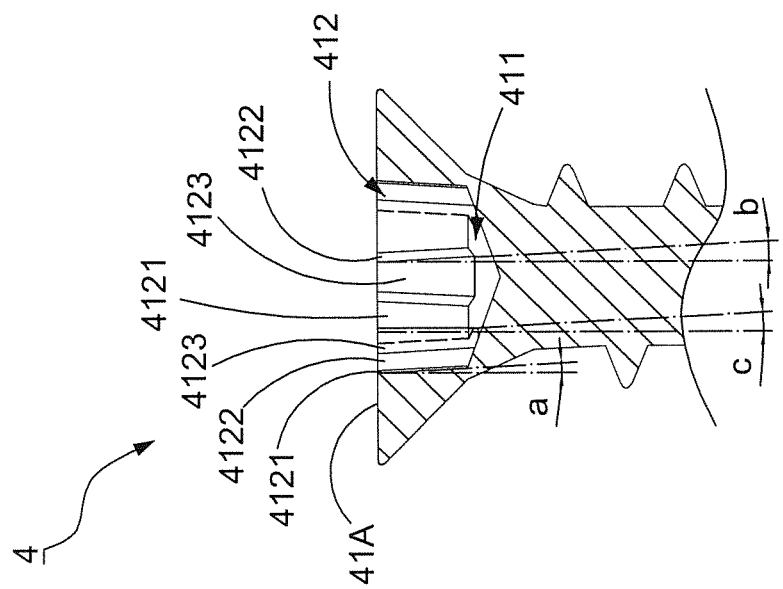
FIG. 11 is a cross-sectional view of the fourth preferred embodiment as seen along the line D-D of FIG. 10.
Figure 10:
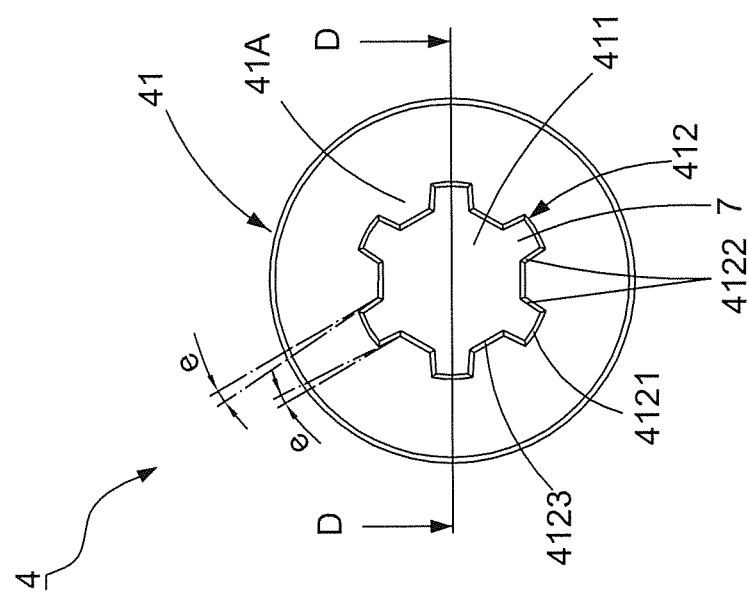
FIG. 10 is a top plan view showing a fourth preferred embodiment of this invention.
Figure 12:
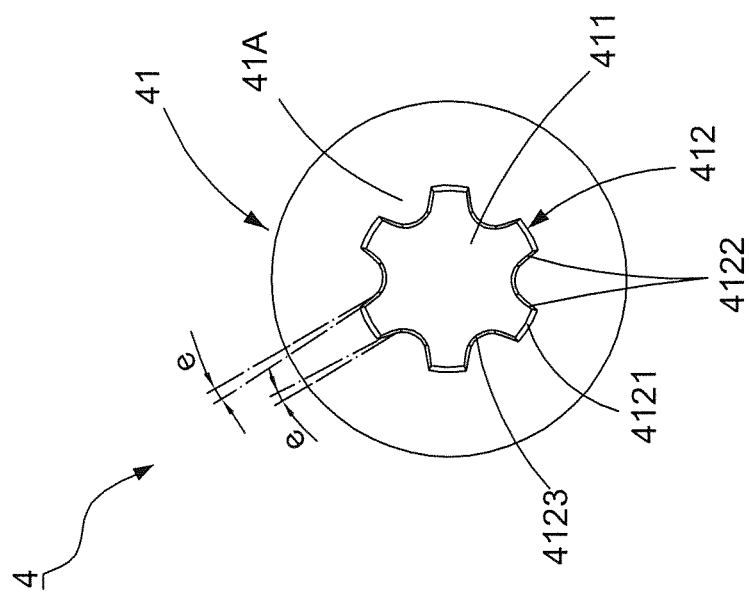
FIG. 12 is a top plan view showing a variation of FIG. 10 in this invention.
Figure 13A:
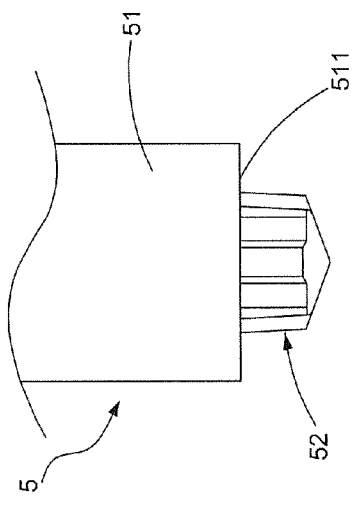
FIGS. 13A-13D are schematic views showing respective punches for forming screw heads shown in FIG. 2, FIG. 4, FIG. 6 and FIG. 10 of this invention.
Figure 13B:
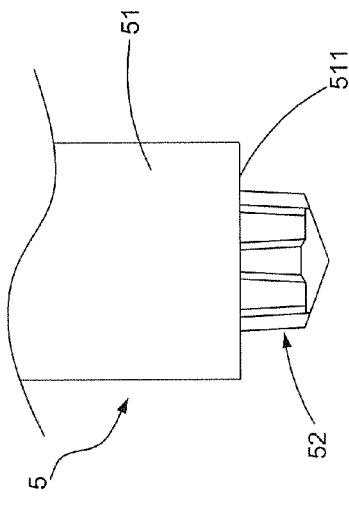
Figure 13C:
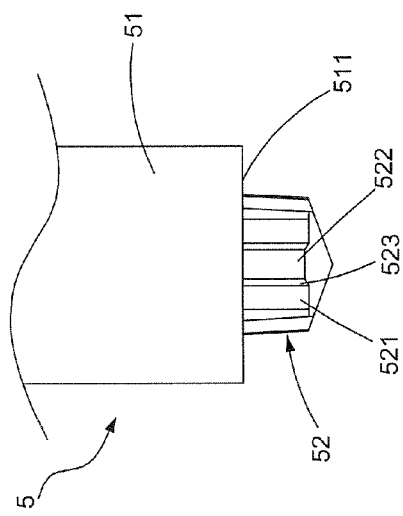
Figure 13D:
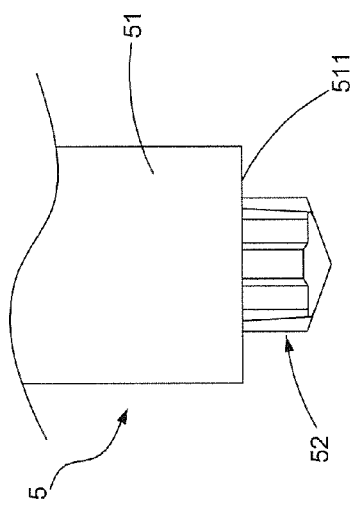
Figure 13E:
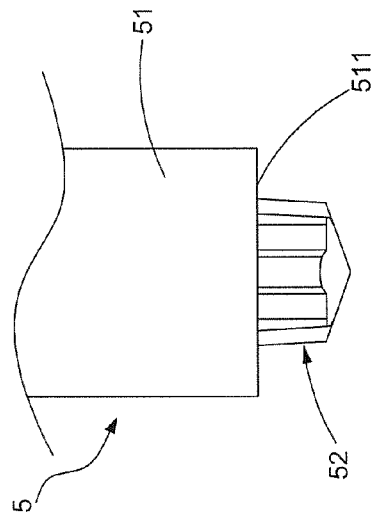
FIGS. 13E-13H are schematic views showing respective punches for forming screw heads shown in FIGS. 8A-8C and FIG. 12 of this invention.
Figure 13F:
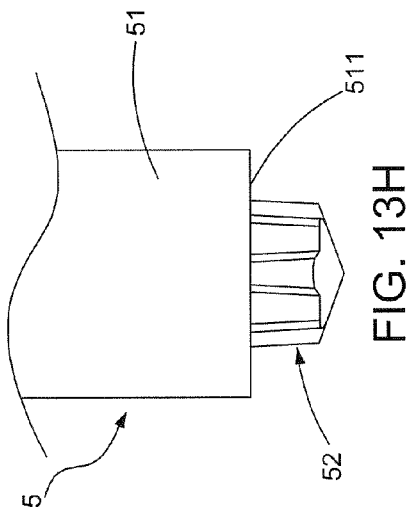
Figure 13G:
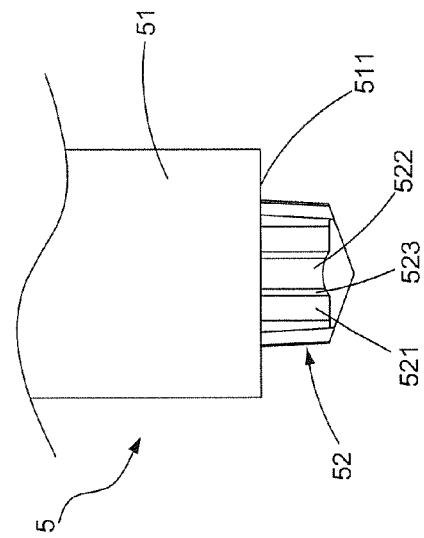
Figure 13H:
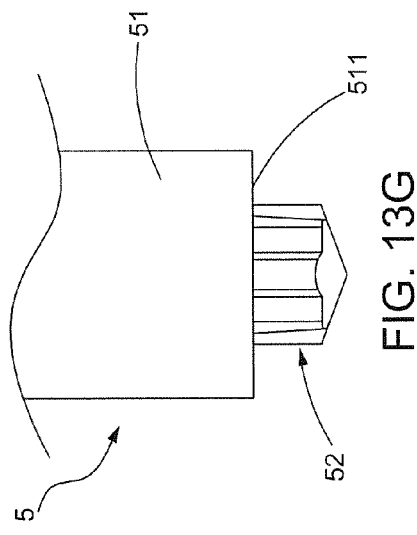

Referring to FIG. 10 and FIG. 11, a fourth preferred embodiment of this invention still includes the same correlated elements as the first preferred embodiment. This embodiment is characterized in that each of the two side walls 4122 also has a slanting surface sloping downwards from the top surface 41A at the slope "b" of at least 1 degree, so each drive region 412 provides a groove 7 having multiple canting surfaces when all of the walls 4121, 4122, 4123 are wider at their upper portions than their lower portions. Concurrently, the side walls 4122, as shown, still deviates by the angle "e" of at least 1 degree. Furthermore, the connecting wall 4123 can be formed in an arched shape to present an internal Torx hexagonal recess, shown in FIG. 12. Accordingly, the end wall 4121, the side walls 4122 and the connecting wall 4123 having respective slopes denoted by "a", "b" and "c" provide multiple slanting surfaces for each of the drive regions 412. If the dimension of the driving tool 6 inserted into the drive socket 411 is smaller or too small, the driving shank 62 comes into contact with those multiple slanting surfaces of the drive region 412 to engage the driving tool 6 with the drive socket 411 firmly. With the aid of the deviating angle "e" of the side walls 4122 in combination with the slanting surfaces of the walls 4121, 4122, 4123, the head structure permits the driving shank 62 to be rightly received in the center of the drive socket 411 for transmitting full torque and also prevents the driving tool 6 from swinging after it is inserted into the drive socket 411. Therefore, the torque of transmission can be completely sent from the drive socket 411 to the recessed screw 4 to save labor and operate more conveniently.

FIGS. 13A-13D show punches 5 for punching and forming screw heads 41 as described in the previous preferred embodiments. The punch 5 is adapted to punch a socket in the head 41 of the screw 4 as described above and shown in FIGS. 2-12. Specifically, the punch 5 includes a punch body 51 and a punch shank 52 protruding from an end 511 of the punch body 51. The punch shank 52 punches a drive socket 411 in the head 41. A peripheral wall of the punch shank 51 forms projections 521, valleys 522 alternating with the projections 521 and transitional walls 523 connected between the projections 521 and valleys 522. The peripheral wall of the punch shank 52 is complementary in shape with each wall of each of the drive regions 412, namely the projection 521 forms the end wall 4121 correspondingly, the transitional walls 523 forms the side walls 4122 correspondingly, and the valleys 522 forms the connecting wall 4123 correspondingly. The peripheral wall of the punch shank 52 forms multiple drive regions 412 around the drive socket 411 of the head 41. For example, the punch shank 52 can form a groove 7 for each drive region 412 of FIG. 2 whose end wall 4121 and connecting wall 4123 are wider at their upper portions than their lower portions and whose two side walls 4122 have no slope (the slope "b" is at 0 degree). The punch shank 52 can also form a groove 7 shown in FIG. 4 whose end wall 4121 is wider at its upper portion than its lower portion and whose two side walls 4122 and connecting wall 4123 have no slope (the slopes "b" and "c" are at 0 degree). The punch shank 52 can also form a groove 7 shown in FIG. 6 whose connecting wall 4123 is wider at its upper portion than its lower portion and whose two side walls 4122 and end wall 4121 have no slope (the slopes "b" and "a" are at 0 degree). The punch shank 52 can also form a groove 7 shown in FIG. 10, all walls 4121, 4122, 4123 of which are wider at their upper portions than their lower portions. Surely, the two side walls 4122 are not parallel to each other because of the angle "e" as described above. It is also possible that the punch shank 52 forms an arch-shaped valley 522 as shown in FIGS. 13E-13H, thereby defining the drive socket 411 as an internal Torx hexagonal recess. The use of the punches 5 forming the sockets for various preferred embodiments as described above attains the effect of producing easily and reducing the wear rate of the punch 5 and facilitates a long-term production without losing the accuracy thereof.

Figure 14:
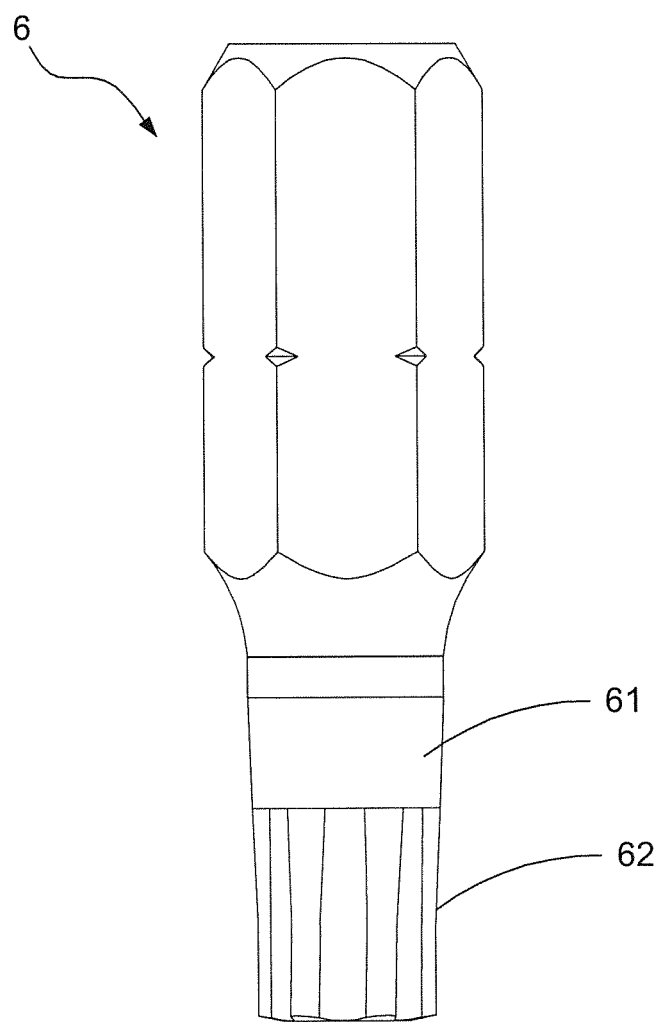
FIG. 14 is a schematic view showing a driving tool for use in the screw heads of the preferred embodiments of this invention.

Referring to FIG. 14, a driving tool 6 for use in the head 4 as described above includes a driving body 61 and a driving shank 62 connected to the driving shank 61. The driving shank 62 is received in the drive socket 411 of the head 41, and a peripheral wall of the driving shank 62 is adapted to the shape of the drive regions 412 as described in the previous four preferred embodiments. When the driving shank 62 is inserted into any one of the drive sockets 411 of the previous embodiments, the peripheral wall of the driving shank 62 can be in close contact with the drive regions 412 to prevent the swinging problem. The torque of the driving tool 6 for transmission can be fully sent from the head 41 to the whole screw 4. This driving tool 6 can also be applied to other international universal hexagonal sockets to attain a wider application. Thus, the convenience of use is largely increased.

To sum up, this invention provides a head having a drive socket and multiple drive regions, each of which provides a slanting surface sloping downwards from a top surface of the head at a slope of at least 1 degree for an end wall, for a connecting wall or for both of the walls. Two side walls of each drive region connecting between the above walls are not parallel to each other as they go inwards toward a central portion of the drive region by an angle difference of at least 1 degree. Therefore, the driving tool inserted into the drive socket can be received at a center of the drive socket and be in close contact with the interior walls of the recessed screw to attain a firm engagement, thereby preventing the tool from swinging at the time of driving, enhancing the torque of transmission, allowing one hand operation and saving more labor. A driving tool for use in the drive socket of the head and a punch for forming the head are also disclosed to facilitate a long-term production without losing the accuracy of production.

While the embodiments of this invention are shown and described, it is understood that further variations and modifications may be made without departing from the scope of this invention.

What is claimed is:

1. A recessed screw, the recessed screw defining an axis extending in a longitudinal direction, and comprising:
a head having a first surface and a second surface in opposing relationship to said first surface; and
a threaded shank extending axially from said second surface of said head;
wherein a drive socket is recessedly formed in said first surface of said head, and a plurality of drive regions are disposed around said drive socket;
wherein each said drive region has a pair of opposing side walls and first and second drive walls connected to said side walls, said first drive wall of each said drive region extending between said pair of opposing side walls of said drive region to be connected to said side walls to define a groove communicating with said drive socket, said second drive wall of each said drive region extending between a side wall of said drive region and a sidewall of an adjacent drive region to be connected between opposing side walls of two adjacent grooves; and
wherein at least one of said first and second drive walls of each said drive region slopes from said first surface of said head towards said second surface at a slope of at least 1 degree inwardly towards the axis, each side wall of said pair of side walls and a corresponding second drive wall of each said drive region meeting at a point from which a reference line is defined, each side wall of said pair of side walls extending between a corresponding pair of first and second drive walls of each said drive region to define a drive line angularly inclined from said reference line toward a central portion of said drive region by an angle difference of at least 1 degree;
said central portion of said drive region being defined by a point of intersection between a center of an edge of said first drive wall of said drive region adjacent to said first surface of said head and a radial reference line extending between the axis and said center of said edge of said first drive wall of said drive region adjacent to said first surface of said head, whereby said pair of opposing side walls of said drive region are angularly inclined towards said central portion of said drive region, and respective edges of said pair of opposing side walls of said drive region adjacent to said first surface of said head thereby being non-parallel to each other.

2. The recessed screw according to claim 1, wherein said first drive wall is an end wall, and said second drive wall is a connecting wall, said connecting wall being formed with an arched contour.

3. The recessed screw according to claim 1, wherein said first drive wall is an end wall and said second drive wall is a connecting wall wherein said connecting wall of each said drive region has a slanting surface sloping from said first surface of said head towards said second surface at a slope of at least 1 degree inwardly towards the axis, and said end wall of each said drive region has a surface extending perpendicularly from said first surface towards said second surface.

4. The recessed screw according to claim 1, wherein said first drive wall is an end wall and said second drive wall is a connecting wall wherein said end wall of each said drive region has a slanting surface sloping from said first surface of said head towards said second surface at a slope of at least 1 degree inwardly towards the axis, and said connecting wall of each said drive region has a surface extending perpendicularly from said first surface towards said second surface.

5. The recessed screw according to claim 1, wherein said first drive wall is an end wall, and said second drive wall is a connecting wall, wherein both said end wall and said connecting wall of each said drive region have respective slanting surfaces sloping from said first surface of said head towards said second surface at a slope of at least 1 degree inwardly towards the axis.

6. The recessed screw according to claim 5, wherein each said side wall of said pair of opposing side walls of each said drive region has a slanting surface sloping from said first surface of said head towards said second surface at a slope of at least 1 degree in a direction each towards the other.

7. The recessed screw according to claim 1, wherein each said side wall of said pair of opposing side walls of each said drive region has a slanting surface sloping from said first surface of said head towards said second surface at a slope of at least 1 degree in a direction each towards the other.

* * * * *